United States Patent [19]

Uchida et al.

[11] Patent Number: 4,556,286

[45] Date of Patent: Dec. 3, 1985

[54] MULTILAYER GUEST HOST LIQUID CRYSTAL DISPLAY WITHOUT POLARIZERS

[75] Inventors: Tatsu Uchida, Sendai; Toru Teshima, Yokohama, both of Japan; Masanobu Wada, deceased, late of Sendai, Japan, by Eiko Wada, heiress; Masami Wada, heir, Hirakata, Japan; Yuri Makuta, heiress, Kobe, Japan

[73] Assignee: Stanley Electric Co., Ltd., Tokyo, Japan

[21] Appl. No.: 455,113

[22] Filed: Jan. 3, 1983

Related U.S. Application Data

[63] Continuation-in-part of Ser. No. 158,275, Jun. 10, 1980.

[30] Foreign Application Priority Data

Jun. 15, 1979 [JP] Japan .................. 54-74646

[51] Int. Cl.⁴ ............................................. G02F 1/133
[52] U.S. Cl. ...................................................... 350/335
[58] Field of Search ..................... 350/335, 349, 339 F, 350/352

[56] References Cited

U.S. PATENT DOCUMENTS 4,097,130 6/1979 Cole et al. ................... 350/349 X
4,266,859 5/1981 Togashi ...................... 350/349 X
4,396,250 8/1983 Wada et al. ...................... 350/335

Primary Examiner—John K. Corbin
Assistant Examiner—David Lewis
Attorney, Agent, or Firm—Cushman, Darby & Cushman

[57] ABSTRACT

A guest-host type liquid crystal display device not requiring the use of external polarizers, comprises: at least two guest-host type liquid crystal cells which are superimposed one upon another, two of which are constructed in a manner that the liquid crystal molecules contained in these two cells and located close to the boundary between the two cells are aligned in a direction parallel to the plane of the boundary, but that the direction of alignment of the molecules in one of these two cells is perpendicular to that in the other cell when a voltage is applied to both cells, or alternatively when no voltage is applied to both cells, or alternatively when a voltage is applied to only one of these two cells. In case the perpendicular state is realized when a voltage is applied to both cells, the molecules are caused to be rearranged in a direction normal to the substrate by the removal of the applied voltage, whereas in case said state is realized when no voltage is applied to both cells, such rearrangement can be achieved by the application of a voltage. The liquid crystal material to be used in the cells is selected from nematic liquid crystal material having a positive dielectric anisotropy and a material having a negative dielectric anisotropy.

10 Claims, 10 Drawing Figures

(a)   (b)   (c)

MULTILAYER GUEST HOST LIQUID CRYSTAL DISPLAY WITHOUT POLARIZERS

CROSS REFERENCE TO RELATED APPLICATIONS

This application is a continuation-in-part of our earlier application Ser. No. 158,275 filed June 10, 1980.

BACKGROUND OF THE INVENTION

1. Field of the invention

The present invention relates to a display device using a mixture of a dichroic dye serving as a guest material and a liquid crystal material serving as a host material to effect a display of a colored image and, more particularly, it pertains to such guest-host type liquid crystal display device which does not require the use of external polarizers.

2. Description of the Prior Art

There have been proposed heretofore many display devices of the so-called guest-host type which use a mixture of a pleochroic dye as a guest material and a liquid crystal material as a host material in a display cell for the purpose of effecting a display of a colored image. Most of them employ a polarizer for polarizing light rays which impinge onto the cell or for analyzing the plane of light rays leaving the cell. However, there has been also proposed a guest-host type display device which does not require the use of such external polarizers. FIG. 6 shows a cross-sectional sketch showing essential aspects of such display device of the so-called White & Taylor type (see, e.g. J. Appl. Phys. Vol. 45, No. 11, Nov. 1974). As shown in FIG. 6, such display device comprises a mixture of a dichroic dye and a liquid crystal material placed between two parallel transparent substrates a and b such as glass plates and sealed with spacers e and f which are placed at the peripheral portions of these substrates. The substrates a and b have transparent electrodes c and d, respectively, which are formed on their inner surfaces so as to adhere thereto. Liquid crystal materials to be used in the White & Taylor type display device are those which can assume a cholesteric orientation when no voltage is applied between the electrodes. That is, for example, as shown in a pattern denoted by "g" in FIG. 6, the molecules of the liquid crystal are arranged in a direction substantially parallel to the plane of the substrate, but in a helical configuration as a whole. Upon application of a voltage between the electrodes c and d, the liquid crystal molecules are caused to be rearranged to assume the so-called homeotropic nematic state where the longitudinal axis of the molecules are oriented in a direction perpendicular to the plane of the substrate, i.e., in a direction parallel to the direction of the applied electric field. This homeotropic nematic orientation is illustrated in FIG. 6 as denoted by "g'". Thus, when no voltage is applied, it should be noted that, among the incident light rays, those having a wavelength in the range of the absorption band characteristic to the dichroic dye are absorbed by the dye, so that the surface of the display cell is viewed to be in the color of the dye. When a voltage is applied between the electrodes c and d, only the liquid crystal molecules existing therebetween are rearranged to assume the aforementioned homeotropic nematic state. Consequently, the light absorption caused by the dye is minimized in the region between the electrodes, so that the display cell can produce a display of a substantially clear image corresponding to the pattern of the electrodes against the colored background.

Although the White & Taylor type display cell can be operated without using either an external polarizer nor an external analyzer as explained above, it has the disadvantage that it requires a relatively high voltage to perform a display of an image having a satisfactory contrast against the colored background. The contrast may be enhanced by decreasing a helical pitch of the cholesteric orientation. However, such decrease in the helical pitch is inevitably accompanied by an increase in the threshold value of voltage which is required for the rearrangement of the liquid crystal molecules into homeotropic nematic orientation. In order to achieve an optimum contrast, a voltage as high as several tens of volts is generally required. Conversely, in order to lower the threshold value of voltage to a practically acceptable level of about ten volts or less, a significant reduction of the contrast cannot be avoided.

SUMMARY OF THE INVENTION

It is a primary object of the present invention to provide a liquid crystal display device which does not require the use of external polarizers and which can give a display of clear images having a high contrast against a colored background by an application of a very low voltage between the electrodes.

BRIEF DESCRIPTION OF THE DRAWINGS

FIG. 6 shows a cross-sectional sketch of the White & Taylor type cell showing two kinds of state of orientation of cholesteric liquid crystal, i.e. a helical state with no voltage applied to and a nematic state with a voltage applied to.

DETAILED DESCRIPTION OF THE PREFERRED EMBODIMENTS

Figure 1:
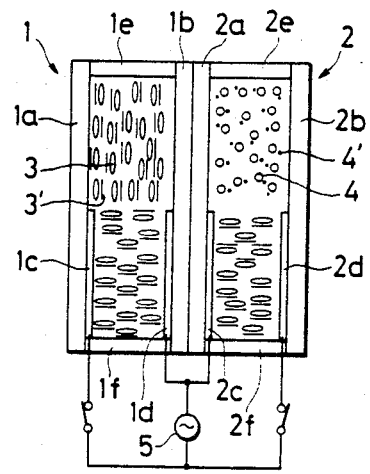
FIG. 1 is a cross-sectional sketch of an embodiment of the display device according to the present invention, showing two kinds of state of orientation of liquid crystals, one of which kinds of state is assumed by the liquid crystals when a voltage is applied and the other of which is assumed by them when the voltage is removed.
Figure 7:
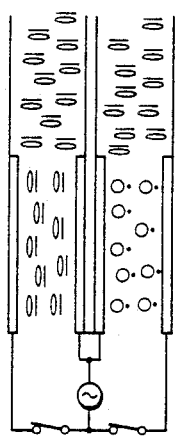
FIG. 7 is a cross-sectional drawing for simply showing the state of orientation of liquid crystals, where the direction of orientation of the molecules in one cell is perpendicular to that of the molecules in the other cell when a voltage is applied across the electrodes.

The above-stated object of the present invention is accomplished by providing a liquid crystal display device which comprises at least two display cells superimposed one upon the other in a manner that the liquid crystal molecules contained in the respective cells and located in the vicinity of the boundary between the two cells are oriented parallel to the plane of the boundary, but the direction of orientation of the molecules in one cell is perpendicular to that of the molecules in the other cell when a voltage is applied between the electrodes, or alternatively when no voltage is applied. In case this perpendicular state is realized when a voltage is applied, the liquid crystal molecules can be unanimously re-aligned in a direction normal to the plane of the boundary as the voltage is removed as shown in FIG. 7, whereas in case the said state is realized when no voltage is applied, such re-alignment can be achieved by an application of a voltage as shown in FIG. 1.

When the perpendicular state exists, light rays are prevented from passing through the boundary. Therefore, a portion of the surface of the display device is viewed to be dark, corresponding to the area where such perpendicular state is present, whereas other portions corresponding to the area where the molecules are aligned in the direction normal to the plane of the substrate are viewed to be clear. It will be apparent that the contrast between the bright and dark portions may be enhanced by achieving for the clear portions, such orientation of the liquid crystal molecules that the light rays can pass through the cells as easily as possible, i.e. with a minimum absorption loss. The contrast may be enhanced also by achieving, for the dark portion, such perpendicular state as a maximum perpendicularity is realized.

The boundary between the two display cells superimposed one upon the other may be practically composed of a laminate consisting of a substrate plate of one cell and that of the other cell, or a single transparent separator plate instead of the laminate. The opposite surfaces of such separator may be provided with required patterns of transparent electrodes and subjected to any known treatment required for causing required orientations of the liquid crystal molecules, so that each surface may perform a function as that presented by a single substrate plate type device. Alternatively, such separator may not have any electrode, though it is subjected to treatment, provided that it does not affect an electric field applied between the outer-located substrates of the cells.

The liquid crystal material used in the cells of the display device according to the present invention may be selected from nematic materials having a positive dielectric anisotropy and those having a negative dielectric anisotropy.

The present invention will be explained in detail hereinunder with reference to the drawings which illustrate schematically some preferred embodiments of the present invention.

Referring to FIG. 1, a display device has a structure consisting of two liquid crystal cells 1 and 2 which are superimposed one upon the other by placing a substrate 1b of the first liquid crystal cell 1 upon a substrate 2b of the second liquid crystal cell 2.

Cell 1 is constructed with two parallel transparent glass substrates 1a and 1b which have transparent electrodes 1c and 1d, respectively, adherently formed on their inner surfaces, spacers 1e and 1f provided on the peripheral of the substrates, and a mixture of a nematic liquid crystal material 3 having a positive dielectric anisotropy serving as a host material and a dichroic dye 3' serving as a guest material, which mixture filling the space surrounded by the substrates and the spacers. The inner surfaces of the glass substrates 1a and 1b and the transparent electrodes which are in contact with the liquid crystal material have been subjected to a known treatment such as rubbing, oblique deposition of silicon oxide or the like for effecting homogeneous orientation of the liquid crystal 3 when no voltage is applied. The long axes of the liquid crystal and the dichroic dye are oriented in the same direction parallel to the plane of the glass substrate.

The second liquid crystal cell 2 is similarly composed of two parallel transparent glass substrates 2a and 2b which have transparent electrodes 2c and 2d, respectively, adherently formed on their inner surfaces, spacers 2e and 2f, and a mixture of a nematic liquid crystal material having a positive dielectric anisotropy 4 and a dichroic dye 4', which mixture filling the space surrounded by the substrates and spacers.

The transparent electrodes of the first cell have a same pattern as that of the transparent electrodes of the second cell, whereby a display of such pattern can be effected, as will be described in detail later, by operating the two cells 1 and 2 which are superimposed one upon the other with glass plates 1b and 2a forming a laminate as a separator between the cells.

The inner surfaces of glass plates 2a and 2b and transparent electrodes 2c and 2d which are in contact with the liquid crystal have been subjected also to the treatment for the homogeneous orientation of the nematic liquid crystal such as rubbing, oblique deposition of silicon oxide or the like, but in this case the treatment is conducted so as to cause the orientation in a direction perpendicular to that of the liquid crystal 3 in the first cell.

Electric source 5 is connected to electrodes 1c and 1d as well as 2c and 2d so that a voltage can be applied between 1c and 1d as well as between 2c and 2d by closing associating switches not shown.

Figure 2:
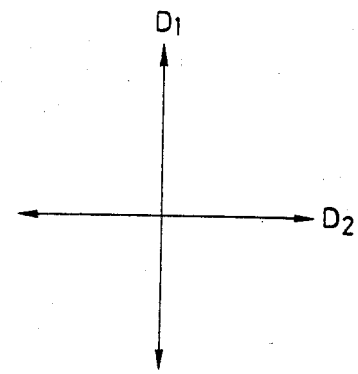
FIG. 2 shows a relationship between the direction of orientation of the liquid crystal contained in one cell and that in the other cell when no voltage is applied.

FIG. 2 shows a relationship in the direction of orientation of molecules between the nematic liquid crystals 3 and 4 when no voltage is applied. The orientation of the molecules of the liquid crystal 3 is denoted by $D_1$ and that of the molecules of the liquid crystal 4 is denoted by $D_2$.

Upper half of the structure shown in FIG. 1 represents a quiescent state of the liquid crystals when no voltage is applied. In such portion, the incident light impinging onto cell 1 is polarized by the liquid crystal contained therein to become linearly polarized light having the plane of polarization parallel to $D_1$ which is transmitted through the cell and impinges onto cell 2. As the molecules of the nematic liquid crystal 4 in cell 2 are aligned in the direction perpendicular to that of the molecules of the nematic liquid crystal 3 in cell 1, i.e. in the direction $D_2$, the linearly polarized light is not able to pass through cell 2, so that a dark display is presented. More strictly speaking, that portion of the display device corresponding to the quiescent state of this display device is viewed to be dark in the tint of the color of the dichroic dye, for example, dark red when the dichroic dye has a red color.

On the other hand, a lower half portion of the structure shown in FIG. 1 represents an electric-field-aligned state of the liquid crystal when a voltage is applied, where the nematic liquid crystals 3 and 4 in cells 1 and 2 are all aligned in a direction normal to the plane of the substrate. Therefore, the incident light can be transmitted through both cells with minimum absorption loss, so that the portion corresponding to such state of the display device is viewed to be clear.

In this way, the display device provided with electrodes having a certain pattern can effect a sharp display of a clear pattern against a dark background in the tint of the color of the dichroic dye when a voltage is applied, because among those molecules of both nematic liquid crystals 3 and 4, only those which exist between the patterned electrodes are aligned parallel to the direction of the applied electric field.

The display device having the structure as described above can work with a lower voltage than that required for operating the White & Taylor type cell, because the use of nematic liquid crystals permits a lower energy consumption for the transition of orientation from the quiescent nematic absorbing state, under absence of voltage, to the field-aligned nematic nonabsorbing state, under application of a voltage as compared with the use of cholesteric liquid crystal which consumes a much higher energy to perform the transition from the quiescent cholesteric absorbing state to the electric-field-aligned nonabsorbing nematic state. Therefore, the display device of the present invention may be used for various applications without suffering from such limitation in the available level of voltage as encountered by the White & Taylor type cell.

Figure 3:
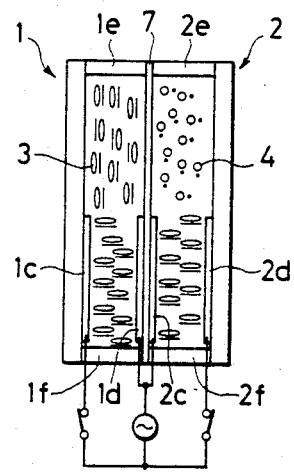
FIG. 3 is a cross-sectional sketch of another embodiment of the present invention similar to that in FIG. 1, but in this case the laminate consisting of two superimposed substrates is replaced by one separator plate at the boundary between the two cells.

FIG. 3 shows a sketch of another type of structure of the display device according to the present invention, similar to that in FIG. 1. In this case, a common separator 7 is substituted by glass substrates 1b and 2a in FIG. 1 for the separation of the nematic liquid crystals 3 and 4 from one another.

Separator 7 and electrodes 1d and 2c have oblique deposits of silicon oxide on their surfaces which are in contact with the liquid crystals for causing the liquid crystals to align in the same directions as those illustrated in FIG. 1. Separator 7 may be preferably made of a transparent glass plate having a thickness of about 0.5 mm or less.

In the structure as shown in FIG. 3, the thickness of the separator 7 can be much smaller than that of the laminate consisting of substrates 1b and 2a in FIG. 1, so that the displacement of the locations between the electrodes 1d and 2c when one views the front side of the structure in an oblique direction relative to the normal to the substrate can be greatly mitigated. Thus, an image produced by the display device having such structure is more sharply defined and easily discernible.

Figure 4:
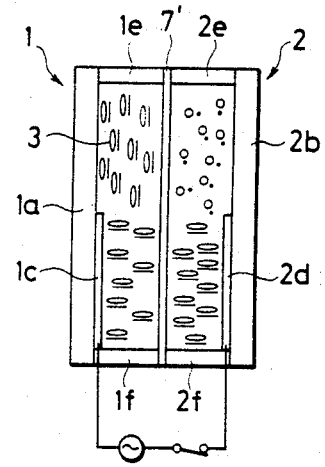
FIG. 4 is a cross-sectional sketch of still another embodiment of the present invention similar to that in FIG. 2, wherein the electrodes on the separator are all eliminated.

FIG. 4 illustrates still another embodiment of the present invention where separator 7' has a very small thickness, and the transition of orientation of the liquid crystals 3 and 4 is carried out by an application of a voltage between electrodes 1c and 2d which are formed on the inner surfaces of substrates 1a and 2b, respectively.

Opposite surfaces of separator 7' have been treated so that the nematic liquid crystal 3 between the glass substrate 1a and the separator 7', and the nematic liquid crystal 4 between the separator 7' and the glass substrate 2b assume the same quiescent state shown in cells 1 and 2 in FIG. 3, respectively, when no voltage is applied. The display device having this structure can effect a display of an image in the same manner as does the device shown in FIG. 3.

Description has been made herein-above with respect to those embodiments where the homogeneous orientation of the molecules of the liquid crystal 3 ($D_1$) is vertical, while that of the liquid crystal 4 ($D_2$) is horizontal as shown in FIG. 2 when no voltage is applied. It should be noted, however, that further embodiments where $D_1$ is horizontal and $D_2$ is vertical may be realized.

Figure 5:
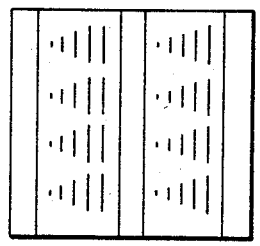
FIG. 5 is a cross-sectional sketch of still another embodiment of the present invention showing a relation in the orientation of liquid crystal between two twisted type cells in the instance that no voltage is applied.

Alternatively, at least one cell in the display device may be of a moderately twisted type instead of the homogeneous nematic type. In such twisted type cell, the plane of polarization is progressively rotated from one side to the other side of the cell. It is necessary in any case that the orientation of the liquid crystal molecules located close to the separator or the boundary in one cell and that in the other cell are parallel to the boundary and perpendicular to each other. FIG. 5 illustrates the orientations of liquid crystals in their quiescent state in an embodiment which has a structure consisting of two twisted type cells.

The two-layer liquid crystal display devices as described above can give a contrast similar in degree to the color contrast given by the conventional White & Taylor type display device under optimum conditions. Moreover, they can work with a very low threshold value of voltage of about 1V at the highest because there is no helical orientation of liquid crystals. Even when the twisted type cells are used as shown in FIG. 5, a high contrast can be obtained with a lower threshold value of voltage than that for the White & Taylor type because the helical pitch of the twisted orientation is much longer than that of the latter type.

In the above aspects of the present invention, the nematic liquid crystals employed have a positive dielectric anisotropy. Alternatively, in another aspect of the present invention, those having a negative dielectric anisotropy may be used for achieving the aims of the present invention.

For example, in the structure as shown in FIG. 1, the liquid crystals contained in both cells are changed to those having a negative dielectric anisotropy whose molecules are aligned in a direction parallel to the normal of the electrode when no voltage is applied and are rearranged to align in a direction parallel to the electrode by an application of a voltage as shown in FIG. 7. The oblique deposition and the treatment for the quiescent orientation which are applied to the inner surfaces of the substrates and to the electrodes are also changed to those which cause the direction of orientation of the liquid crystal molecules located close to the boundary in one cell and that in the other cell to be parallel to the boundary but perpendicular to each other when a voltage is applied. By using this structure, one can obtain a dark state when a voltage is applied and a clear state when the voltage is released. Thus, a dark image can be displayed against a clear background with good contrast.

When such two-layer display device is prepared by the use of nematic liquid crystals having a negative dielectric anisotropy, one may employ such technique as disclosed in U.S. Pat. No. 4,291,949. Part of the disclosure of the Patent is incorporated by reference herein. There is taught a technique where substrates are treated for orientation of liquid crystal materials in such manner as the molecules thereof are aligned in a direction inclined at an angle $\theta$ to the normal to the substrate when no voltage is applied. For example, in the structure as shown in FIG. 1, cell 1 is changed to a guest-host type cell using a nematic liquid crystal having a negative dielectric anisotropy where the substrates have been treated so as to cause an orientation of the molecules of the liquid crystal in a direction parallel to the plane of the sheet of paper on which the figure is drawn, but inclined at an angle $\theta$ to the normal to the substrate when no voltage is applied. The molecules of the liquid crystal is rearranged to be oriented in a direction parallel to both the plane of the sheet of drawings and the plane of the substrate by an application of a voltage. Moreover, cell 2 is changed to another guest-host type cell containing a nematic liquid crystal having a positive dielectric anisotropy where the substrates have been treated so as to cause an orientation of the molecules of the liquid crystal in a direction at an angle of 90° to the direction of orientation caused in the adjacent cell when a voltage is applied. That is, the substrates have been treated so that the molecules of the liquid crystal are aligned in a direction parallel to the plane perpendicular to the plane of the sheet of drawings and inclined at an angle $\theta'$ to the normal to the substrate when no voltage is applied. The liquid crystal molecules are rearranged to orient in a direction parallel to the substrate and normal to the plane of the sheet of drawing when a voltage is applied. The angle $\theta$ and $\theta'$ are each very small. Therefore, possible light absorption will not be significant. Accordingly, by using the two-layer display device having cell structures as described above, one can obtain a dark state when a voltage is applied and a clear state when the voltage is removed, i.e. a dark image against a clear background with an acceptable contrast. In addition, such display device can be operated in a short time of response with an application of a relatively low voltage of at most around 10 volts as will be apparent from the teaching of U.S. Pat. No. 4,291,949.

Figure 8:
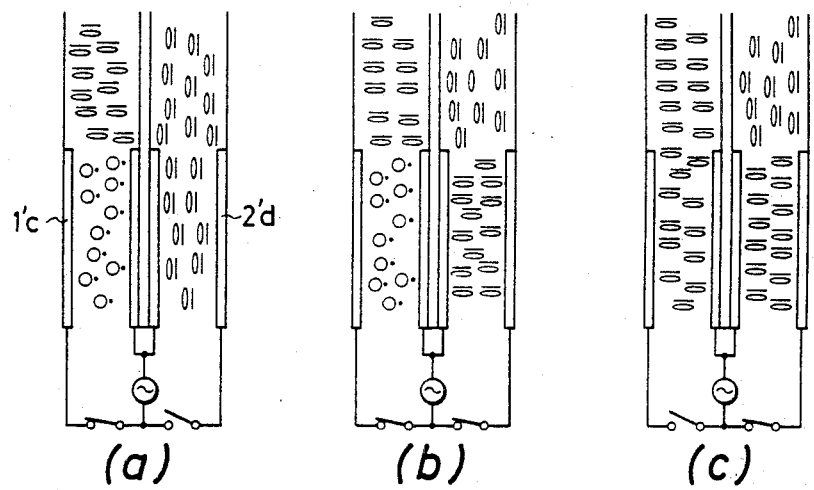
FIG. 8 is a cross-sectional drawing for showing the state of orientation of liquid crystals in a display device made of two cell devices, one of which contains a nematic liquid crystal having a positive dielectric anisotropy and the other of which contains a nematic liquid crystal having a negative dielectric anisotropy.

The requirement that the direction of orientation of the molecules in one cell is parallel to the plane of the substrate and perpendicular to the direction of orientation of the molecules, which are also parallel to the plane of the substrate, in the other cell may be realized by using a liquid crystal having a negative dielectric anisotropy in one cell and that having a positive dielectric anisotropy in the other cell. In such two-cell display device, there can be obtained three kinds of states of orientation by actuating switches as indicated by (a), (b) and (c) in FIG. 8. It is apparent that in the state of orientation shown in FIG. 8 (a), the portion sandwiched between electrodes 1'c and 2'd is viewed dark.

Although the present invention has been described herein-above with respect to two-layer type liquid crystal display devices, it will be appreciated from the description that the display device of the present invention may be composed of three or more cells superimposed one upon another, if desired. The use of such multilayer display devices having a combination of different patterns of electrodes and a circuit for actuating these electrodes permits a display of a more complicated information.

It will be appreciated, moreover, that the liquid crystal display devices of the present invention may be composed of three or more cells, at least one of which contains a nematic liquid crystal having a dielectric anisotropy of a different polarity from that used in the other cell, though the fundamental structure of the present invention is composed of two cells which employ nematic liquid crystals of the same polarity. For example, there may be used a combination of polarities in the order of layers (positive, negative, positive), (negative, positive, negative), and so on, provided that at least two of the selected cells are constructed to satisfy the essential requirement for the two-layer structure of the present invention described above, that is, the requirement that the direction of orientation of the liquid crystal molecules in one cell and that in the other cell are parallel to the substrate but perpendicular to each other in one state of the actuation of switches. The remaining cells must be constructed so as to effect orientations in such way that will not substantially interfere with the relationship between the two cells with respect to the clear and dark states.

Figure 9:
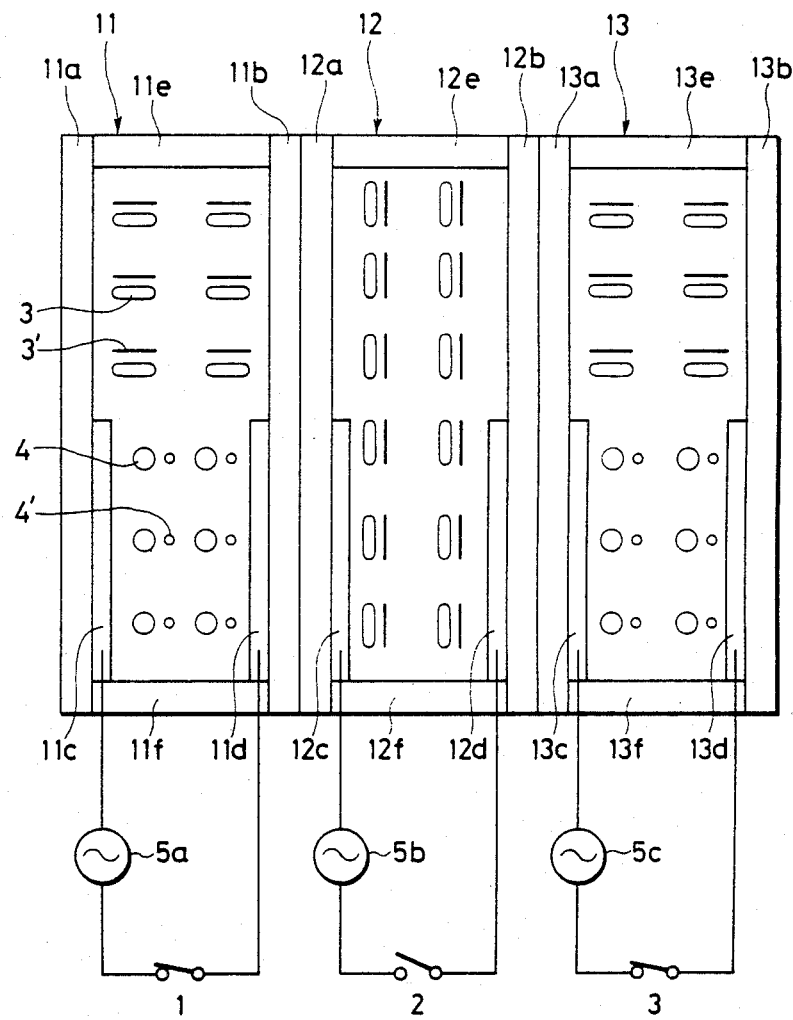
FIG. 9 is a cross-sectional drawing of another embodiment of the present invention illustrating a display device made of three-cell devices.

An example of the liquid crystal display composed of three devices is shown in FIG. 9. One of the three cells is constructed so that it does not interfere with the relationship between the other two cells with respect to the dark and clear state represented by the two cells. One of the three cells may be made using a nematic liquid crystal material having a dielectric anisotropy of a different polarity from that used in the other cells.

Referring to FIG. 9, a display device has a structure consisting of three liquid crystal cell 11, 12 and 13 which are superimposed one upon the other by placing a substrate 11b of the first liquid crystal cell 11 upon a substrate 12a of the second liquid crystal cell 12 and a substrate 13a of the third liquid crystal cell upon a substrate 12b of the second liquid crystal cell 12.

Cell 11 is constructed with two parallel transparent glass substrates 11a and 11b which have transparent electrodes 11c and 11d, respectively, adherently formed on their inner surfaces, spacers 11e and 11f provided on the peripheral of the substrates, and a mixture of a nematic liquid crystal material 3 having a negative dielectric anisotropy serving as a host material and a dichroic dye 3' serving as a guest material, which mixture fills the space surrounded by the substrates and the spacers. The lower portion of the first liquid crystal cell 11 contains a mixture of a nematic liquid crystal material 4 having a negative dielectric anisotropy and a dichromic dye 4'. The inner surfaces of the glass substrates 11a and 11b and the transparent electrodes which are in contact with the liquid crystal material have been subjected to a known treatment such as rubbing, oblique deposition of silicon oxide or the like for effecting homogeneous orientation of the liquid crystal 3 when no voltage is applied.

The second liquid crystal cell 12 is similarly composed of two parallel transparent glass substrates 12a and 12b which have transparent electrodes 12c and 12d, respectively, adherently formed on their inner surfaces, spacers 12e and 12f, and a mixture of a nematic liquid crystal material 3 having a positive dielectric anisotropy serving as a host material and a dichroic dye 3' serving as a guest material, which mixture fills the space surrounded by the substrates and spacers.

The third liquid crystal cell 13 also is composed similarly to the first cell 11 using a nematic liquid crystal having a negative dielectric anisotropy. The transparent electrodes of all three cells have the same pattern whereby a display of such pattern can be effected, as will be described in detail later, by operating the three cells 11, 12 and 13 which are superimposed one upon the other with glass plates 11b and 12a and 12b and 13a forming a laminate as a separator between respective cells.

As with cell 11 the inner surfaces of glass plates 12a and 12b, 13a and 13b and as well as transparent electrodes 12c, 12d, 13c and 13d which are in contact with the liquid crystal have also been subjected to the treatment for the homogeneous orientation of the nematic liquid crystal such as rubbing, oblique deposition of silicon oxide or the like, but in this case the treatement is conducted so as to cause the orientation in a different direction from that of the liquid crystal in the next adjacent cell.

Electric sources 5a, b and c are connected to electrodes 11c and 11d as well as 12c, 12d, 13c and 13d so that a voltage can be applied between 11c and 11d as well as between 12c, 12d, 13c and 13d by closing associating switches.

As the liquid crystal in cell 2 has a positive anisotropy, while those in cells 1 and 3 have a negative anisotropy, by actuating switches, one can achieve various states as indicated in the following table:

| Cells | | | |
| --- | --- | --- | --- |
| 1 | 2 | 3 | |
| on | off | off | |
| on | off | on | dark |
| off | off | on | |
| on | on | on | |
| off | on | on | |
| off | on | off | bright |
| on | on | off | |
| off | off | off | |

One can select as switching operation corresponding to any one of combinations of dark and bright states as shown in the above table.

Figure 10:
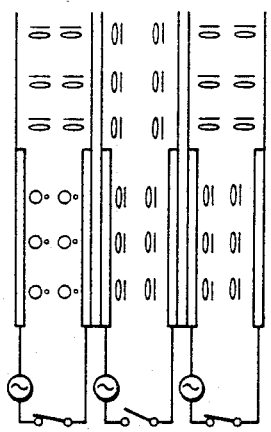
FIG. 10 is a cross-sectional drawing for showing the state of orientation of the molecules in a display device like that shown in FIG. 9, but in this case the direction of orientation of the molecules in the third cell is different from that in FIG. 9 when a voltage is applied.

The surfaces of the electrodes in the third cell 13 may be treated so that the molecules between the electrodes are oriented in a direction perpendicular to the direction of orientation of the molecules in the first cell 11 when a voltage is applied as shown in FIG. 10. In this case, one can achieve various states as indicated in the following table.

| Cells | | | |
| --- | --- | --- | --- |
| 1 | 2 | 3 | |
| on | on | on | |
| on | off | on | dark |
| on | off | off | |
| on | on | off | |
| off | on | on | |
| off | on | off | bright |
| off | off | on | |
| off | off | off | |

The state of orientation shown in FIG. 10 may be modified by treating the surfaces of the electrodes in the middle cell so that the molecules between the electrodes are oriented in a direction parallel to the direction of orientation of the molecules in the first cell 11 but perpendicular to that of the molecules in the third cell 13.

It will be appreciated from the above description that the display device composed of three or more cells superimposed one upon another according to the present invention can effect dark and clear states by appropriately actuating the switches.

Figure 6:
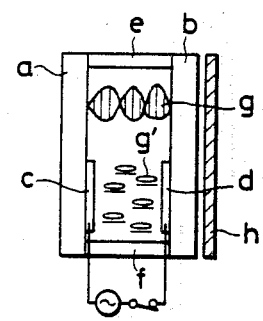

It should be noted that the display device may be provided with a reflector on the rear side thereof so that one may be able to have a view of an image produced by the reflected light on the front side, on which the incident light impinges. For example, the reflector may be placed in a manner as shown in FIG. 6 denoted by h.

What is claimed is:

1. A guest-host type liquid crystal display device not requiring the use of external polarizers, comprising:
   a plurality of guest-host type liquid crystal cells which are superimposed one upon the other, two of which are constructed in a manner that the liquid crystal molecules contained in these two cells and located close to a boundary between the two cells are oriented in a direction parallel to the plane of the boundary, but that the direction of orientation of the molecules in one of these two cells is perpendicular to that in the other cell when a voltage is applied to both cells, or alternatively when no voltage is applied to both cells, or alternatively when a voltage is applied to only one of these two cells to exhibit a dark state and a clear state.

2. A guest-host type liquid crystal display device according to claim 1, in which:
   said two cells are constructed by using a nematic liquid crystal material having a positive dielectric anisotropy.

3. A guest-host type liquid crystal display device according to claim 1, in which:
   said two cells are constructed by using a nematic liquid crystal material having a negative dielectric anisotropy.

4. A guest-host type liquid crystal display device according to claim 1, in which:
   said two cells are of a twisted type.

5. A guest-host type liquid crystal display device according to claim 1, in which:
   said boundary comprises a laminate consisting of a substrate of one cell and that of the other cell.

6. A guest-host type liquid crystal display device according to claim 1, in which:
   said boundary comprises a thin separator.

7. A guest-host type liquid crystal display device according to claim 1, in which:
   two guest-host type liquid crystal cells which are superimposed one upon the other and which are constructed in a manner that the liquid crystal molecules contained in the respective cells and located close to a boundary between the two cells are oriented in a direction parallel to the plane of the boundary, but that the direction of orientation of the molecules in one cell is perpendicular to that in the other cell when a voltage is applied across electrodes in one cell and no voltage is applied across electrodes in the other cell, and
   one of the two cells contains a nematic liquid crystal having a different polarity from that used in the other cell.

8. A guest-host type liquid crystal display device according to claim 1, in which:
   an additional cell is superimposed with said two cells one upon another to form three cells, and said additional cell is constructed in a manner such that it does not interfere with either of said two cells such that the liquid crystal molecules contained in these two cells and located close to a boundry between the two cells are oriented in a direction parallel to the plane of the boundry, provided that the direction of orientation of the molecules in one of these two cells is perpendicular to that in the other of said two cells when a voltage is applied to both cells, or alternatively when no voltage is applied to both cells, or alternatively when a voltage is applied to only one of these two cells, to exhibit a dark state and a clear state.

9. A guest-host type liquid crystal display device according to claim 8, in which:
  three cells contain a nematic liquid crystal material having a dielectric anisotropy of a same polarity.

10. A guest-host type liquid crystal display device according to claim 8, in which:
  one of said three cells is constructed by using a nematic liquid crystal material having a dielectric anisotropy of a different polarity from that used in the other cells.

* * * * *